Dec. 25, 1962 E. DODSWORTH 3,070,004
HEAT SEALING OF THERMOPLASTIC MATERIALS
Filed Dec. 27, 1960
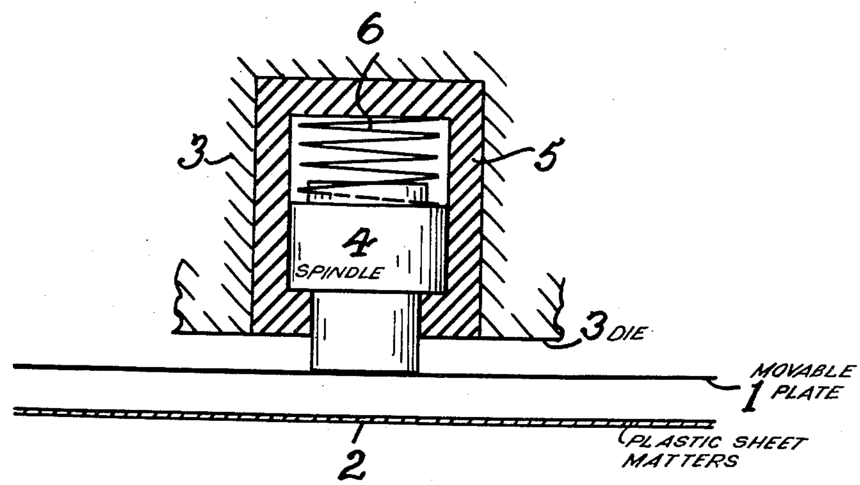

United States Patent Office 3,070,004

Patented Dec. 25, 1962

3,070,004

HEAT SEALING OF THERMOPLASTIC MATERIALS

Edward Dodsworth, Bolton, Bradford, England, assignor to John Waddington Limited, Yorkshire, England Filed Dec. 27, 1960, Ser. No. 78,589
1 Claim. (Cl. 100—93)

The invention relates to the heat sealing of thermoplastic materials of various kinds and for various purposes. In particular, but without limiting the scope of the invention, it is suitable for use in securing polystyrene or polythene closure caps or lids on packages or containers of similar thermoplastic material.

During heat sealing of thermoplastic materials employing a heated pressure element or die, difficulty is frequently experienced in preventing the die from sticking to the plastic material, thus rendening separation difficult, tending to disturb the seal and also to deform the surface of the material. This difficulty becomes accentuated in impact or high pressure type sealing when the parts to be sealed together are of different or non-uniform thickness or shape demanding considerable force over the whole area of the surfaces to be sealed.

Various proposals have hitherto been made for overcoming this difficulty of the sticking of the heating element or die to the plastic material, but none has proved entirely satisfactory. Coating the face of the element or die with fluorinated polythene (such as that known under the registered trademark Fluon) or with heat-resistant silicone rubber is disadvantageous in that the coating is a bad heat conductor and it is susceptible to damage by impact or pressure of sealing. Application to the face of the element or die of a release agent (e.g. a silicone oil or oils) which may be done by coating the face directly or by making the face porous and impregnating or continuously injecting it with the agent either periodically or from a reservoir in or on the element, requires frequent attention and/or replacement of the coating, the porous face (where used) of the element or die rendering it more susceptible to wear resulting in inaccurate sealing. Use of the impulse heating—that is, cutting off the heating energy from the element or die to enable the later to cool off partially before separating it from the sealed surface—requires an element or die of small mass and/or with rapid cooling properties, is wasteful of energy and slows down production.

The object of the present invention is to overcome the aforesaid difficulties so to this end the invention consists in interposing a plate member between a thermoplastic material to be sealed and a heated element or die, which member simultaneously engages the said material and the die during the sealing operation but is separated therefrom upon completion of the operation, heat being transmitted to the member by engagement of the die therewith. The plate member has a large area relative to the die and is preferably composed of smooth material possessing good heat conductivity.

It must be understood that the invention may be achieved and carried into effect in several ways.

In one example, as diagrammatically shown in the accompanying sectional drawing, a plate member 1 composed of thin spring steel is interposed between the thermoplastic material 2 to be sealed to a container or other article (not shown) and an element such as a die 3 of appropriate size and shape which is adapted to be heated in any suitable manner. The die is furthermore reciprocable by the incorporation of any well known mechanism.

The plate 1 is normally supported in spaced relationship to a die 3 through the intermediary of a spindle 4 attached at one end to the plate, the other end of the spindle being held slidably captive within an insulating bushing 5 against the pressure of a spring 6. The insulated bushing 5 houses the spindle 3 wholly within the cylindrical opening therein when the spring 6 is in compressed condition and the bushing 5 includes stop means 7 in the shape of a washer to limit the downward and outward movement of the spindle under normal spring tension by the bearing engagement of the stop means 7 against the lower shoulder of the spindle 7.

The plate 1 preferably has a smooth surface for engagement with the thermoplastic material 2 and a relatively large area.

When the die 3 moves towards the plastic material 2 and die counterpart the plate 1 moves simultaneously therewith until it engages the said material and counterpart whereupon movement of the said plate 1 ceases and the die continues to advance until it engages the plate, during which the spring 6 is compressed. Immediately the die 3 contacts the plate 1, heat is rapidly transmitted from the former to the latter and the desired sealing operation is effected.

Upon withdrawal of the die the spring 6 operates to automatically part or move the plate 3 from the die, and because of the insulating bush 5 and the thin nature of the plate, heat quickly dissipates from the plate 1.

The said sequence of operations is repeated as often as is necessary.

Instead of the arrangement heretofore described, the plate 3 may be supported by spring means from the die counterpart or mould.

Or again, the plate 3 may be mounted relative to the die and counterpart in a manner whereby the said plate automatically moves to and fro at an angle of 90° to the die to be interposed between the die and thermoplastic material when desired. Mechanism for effecting such a motion could be actuated by and synchronized with the die or with the mould or counterpart in the event of the latter being movable relative to the die.

Notwithstanding the mechanical methods described, the plate 3 could be manually interposed in the desired position whenever required.

Amongst numerous advantages arising from use of this invention are:

(*a*) Cutting or distortion of the material to be sealed is eliminated or greatly reduced due to the smooth plate 1 of large area contacting the material 2.

(*b*) An equalising of pressure on all parts of the sealing surface of the thermoplastic material and a higher permissible pressure without causing cutting as in (*a*).

(*c*) Production of a glazed or smooth sealed surface due to rapid cooling of the plate member 1.

(*d*) Damage to the heated element or die 3 is less serious and time and labour wastage is reduced, since a good sealing effect may still be obtained if the plate member be maintained in good condition or is replaced at small expense.

This invention may be particularly useful for sealing lids on containers of high impact polystyrene or other thermoplastic material.

It must be understood that in the foregoing description and ensuing claim the terms "element and die" be interpreted to include moulds or die counterparts whenever applicable.

I claim:

Apparatus for heat sealing sheets of thermoplastic material comprising a heated die adapted for contacting a plurality of said sheets and to be retracted from said sheets, an insulated bushing having a closed back in the shape of a can recessed within said die, a spindle mounted for reciprocating sliding movement wholly within said bushing, a spring mounted on the back end of said spindle and engaging the back of said bushing at the other end to normally urge said spindle away from back end of said bushing, said bushing including stop means at its open end in the shape of a washer flush with the surface of said die, said stop means engaging a shoulder on said spindle and limiting the outer projecting movement of said spindle beyond said die under the tension of said spring and a flat uniformly thin metal plate integrally attached to the outer projecting surface and substantially parallel to the surface of said plate extending substantially beyond the walls of said bushing in both directions to provide a large area which adapts said plate to be heated quickly by said die when said spindle is retracted to contact said plate with said heated die to dissipate heat quickly to the thermoplastic material which is heat sealed by said plate and to dissipate heat to the atmosphere when said spindle is urged normally outwardly by the action of said spring to push said plate out of contact with said die.

References Cited in the file of this patent

UNITED STATES PATENTS

| | | |
|---|---|---|
| 2,425,388 | Oestricher | Aug. 12, 1947 |
| 2,638,964 | Andina | May 19, 1953 |